(12) United States Patent
Lippert

(10) Patent No.: US 6,634,563 B1
(45) Date of Patent: Oct. 21, 2003

(54) NON-TRANSFERABLE ENTITLEMENT IDENTITY CARD

(75) Inventor: Johannes Lippert, St. Wolfgang (AT)

(73) Assignee: Skidata AG, Gartenau (AT)

( * ) Notice: Subject to any disclaimer, the term of this patent is extended or adjusted under 35 U.S.C. 154(b) by 0 days.

(21) Appl. No.: 09/936,255

(22) PCT Filed: Mar. 3, 2000

(86) PCT No.: PCT/EP00/01889

§ 371 (c)(1), (2), (4) Date: Nov. 26, 2001

(87) PCT Pub. No.: WO00/54216

PCT Pub. Date: Sep. 14, 2000

(30) Foreign Application Priority Data

Mar. 10, 1999 (DE) .......................... 199 10 480

(51) Int. Cl.⁷ .............................. G06K 19/06
(52) U.S. Cl. ....................... 235/492; 235/488
(58) Field of Search ................ 235/492, 380, 235/381, 385; 361/487, 488, 739

(56) References Cited

U.S. PATENT DOCUMENTS 3,662,480 A  5/1972 Gilson, Jr. et al.
4,209,189 A  6/1980 Betterley
5,032,823 A  7/1991 Bower et al.
5,660,663 A  8/1997 Chamberlain et al.

FOREIGN PATENT DOCUMENTS

| DE | 689 17 028 T2 | 1/1995 | |
| DE | 44 36 284 A1 | 4/1996 | |
| DE | 44 46 662 A1 | 6/1996 | |
| EP | 0 595 549 A2 | 5/1994 | |
| JP | 411015377 | * 1/1999 | .......... G06K/17/00 |
| WO | WO 96/12513 | 6/1993 | |
| WO | WO 96/11451 | 4/1996 | |

\* cited by examiner

*Primary Examiner*—Daniel St. Cyr
(74) *Attorney, Agent, or Firm*—Flynn, Thiel, Boutell & Tanis, P.C.

(57) ABSTRACT

A non-transferable entitlement identity card (1), with a contact-free readable and writable chip (5) with an antenna (6) and a loop (9), which can be pushed through an eye (13) or similar aperture in the clothing of the entitled user and can be secured in such a way that it can only be released by destroying it, consists of two sections (3,4) capable of being adhesively bonded to one another by surfaces. The chip (5) with the antenna (6) and the end sections (11,12) of the loop (9) are arranged in the surfaces of the two sections (3,4) which have been bonded together.

20 Claims, 1 Drawing Sheet

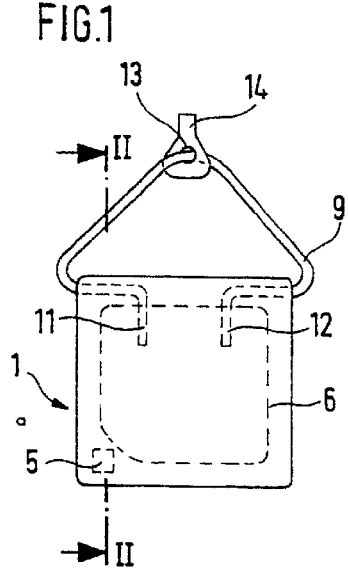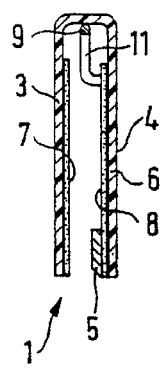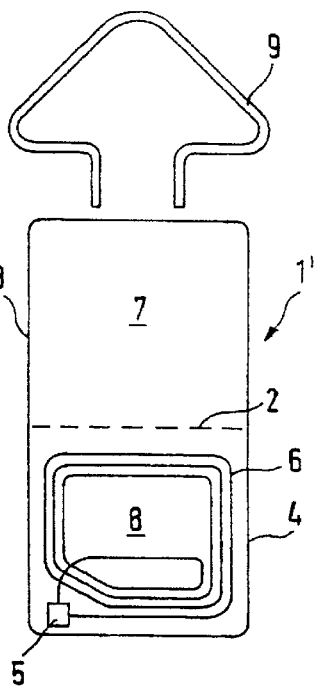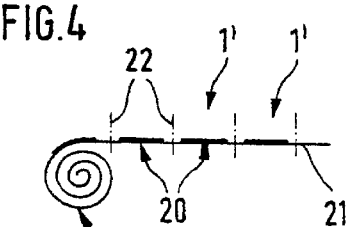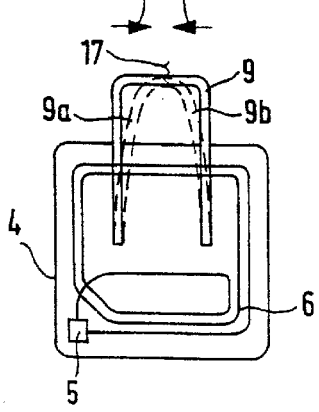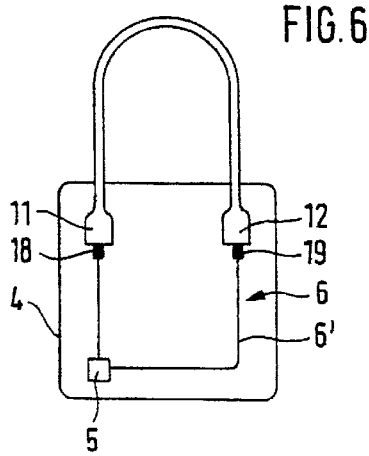

NON-TRANSFERABLE ENTITLEMENT IDENTITY CARD

FIELD OF THE INVENTION

The invention relates to a non-transferable entitlement identity card with a contact-free readable and writable chip.

BACKGROUND OF THE INVENTION

An entitlement identity card is known (WO 96/11451). It is formed by a card, which features a hole. As a connecting element, use is made, for example, of a plastic strip, which is inserted through this hole and, for example, through the hole in a zip fastener slide. In order to prevent the entitlement identity card from being released from the zip fastener slide, and therefore running the risk of being attached to the clothing of a person without entitlement, with the known entitlement card the ends of the plastic strip are indissolubly connected to one another. This connection is made, for example, by a locking mechanism, e.g. similar to a cable connector; in other words, in such a way that it is destroyed after opening. Persons who have such plastic strips which have not yet been locked together, however, are easily able to misuse the known non-assignable card, by cutting through the strip secured to the zip fastener slide and replacing it by a new one.

SUMMARY OF THE INVENTION

The object of the invention is to provide a simply-formed, non-assignable entitlement identity card which functions free of contact, with substantially improved security against misuse.

With the entitlement identity card according to the invention, the chip and the antenna are located in areas adhesively bonded to one another that are between the two sections of the entitlement identity card. The connecting element consists of a loop, the ends of which are adhesively bonded into the surfaces bonded to one another between the two sections.

This means that the securing of the entitlement identity card to the clothing of the entitled person is effected by inserting the open strip or other connecting element from which the strip is formed, through the eye of a zip fastener slide on the clothing of the person with entitlement. Then, for example, adhesively bonding the two sections with the chip and the antenna between them, and in this situation jointly adhesively bonding the two ends of the connecting element between the two sections.

The loop is therefore firmly anchored in the adhesive bonding material at the joined surfaces of the two sections. Misuse by persons who are in possession of such connecting elements, and who intend to cut off the connecting element which has been bonded into place, in order to remove it from the entitlement identity card and secure it with a new connecting element to the clothing of a non-entitled person, is therefore practically excluded.

Specifically, if an attempt is made for the two sections to be pulled apart, in order to remove the loop with its ends bonded between them, the antenna is destroyed and/or torn off the chip, because the antenna and/or the chip are secured to both sections after being bonded together.

To achieve this, the chip with the antenna can be located on one of the two sections. The other section features the surface provided with the adhesive. It is also possible, however, for both sections, or only the section provided with the chip and the antenna, to be provided with an adhesive surface, which extends at least over a part of the antenna and/or the chip.

For preference, the loop then runs with its end sections transversely over the antenna or at least one of its windings, and is therefore also adhesively bonded to it. If an attempt is made to pull out the end of the loop, the antenna bonded to the end of the loop will therefore be destroyed.

According to the invention, a simply designed data carrier for the contact-free monitoring of persons is provided with a non-transferable coating for taking advantage of a service, which interacts "hands-free" with a writing or reading device, such as an access control device, for example of ski lifts and cable railway systems.

The entitlement identity is for preference designed in card format. The two sections may consist, for example, of paper, cardboard, a film, or some other flat material.

If at least one of the two sections of the entitlement identity card is designed to be transparent, at least in the area at which the loop is bonded in place, manipulations of the loop in this area will be visible during an inspection.

The surface provided with adhesive may extend over the entire surface of one or both sections. Regardless, in any event, one part of the contact surface between the two sections must be provided with adhesive, and specifically in the area of the chip and/or at least a part of the antenna.

The loop may be a strip, a string, a filament, or similar longitudinal connecting element, which can be pushed through an eye or similar opening on the clothing. Such an opening, for example, can be the eye in the tab of a zip fastener slide, a buttonhole, a loop secured to the clothing, through the interstices of a pullover, or similar aperture on the clothing.

If the connection element is cut off outside the entitlement identity card, and then reconnected in order to be secured to the clothing of the person without entitlement, for example by means of an adhesive strip, this is in most cases visible and therefore easily checked.

In order to prevent cutting, however, it is possible for a loop made of a material of high strength to be used from the outset. In other words, for example, instead of a flexible connecting element such as a strip, a rigid connecting element can be used, such as a bar or similar shaped part, made in particular of metal, such as wire.

The antenna consists for preference of several windings arranged in spiral fashion. It can, for example, be manufactured by pressing, etching, or stamping. It may also consist of wire, which is bonded to the chip. As a result, in the event of the two sections being pulled apart by force, the wire will be torn from the chip.

If the loop consists of a bar, then at least one end of the bar can be bent and bonded in such a way that it engages behind the windings of the antenna, so that, in the event of an attempt to draw the bar out of the identity card by force, it will be destroyed.

The entitlement identity card may be printed with validity dates, but is to advantage even without validity dates printed on it, since then, in the event of illegal sale of the identity card, the purchaser will have no means of checking whether the card illegally offered to him is still at all valid.

The two sections which form the identity card consist for preference of a part which features a fold line in the centre area. Accordingly, the identity card is formed by folding the part together and then adhesively bonding the two halves or sections.

The loop or bar can be adhesively bonded in the area of the fold line or at the opposite end of the entitlement identity card. This means that, with the entitlement identity card secured to the clothing, the fold line may run at the top or the bottom edge of the card. The embodiment in which the fold line runs at the lower edge is of advantage, for example, if a bar is bonded in place under preliminary tension. Specifically, if the bar is separated outside the card, the areas of the bar which are bonded to the antenna will pull on the antenna, as a result of which it will be destroyed.

The adhesive surface on the inner side of one or both sections of the entitlement identity card according to the invention may be provided with a protective film or similar covering. This covering is drawn off or removed in some other manner before the two parts are bonded together, and, in the case of two sections connected together by a fold line, before the folding takes place.

The handling and use of the entitlement identity card according to the invention is rendered substantially easier by the fact that a carrier is used which consists of a multiplicity of fields separable by predetermined separation lines. The two sections of an entitlement identity card are bonded on each field. After the separation of a field with the two sections of the entitlement identity card, the carrier then forms the protective covering.

The carrier may be made of paper, cardboard, a film, or another flat material. The predetermined separation points may be formed, for example, by a perforation.

For preference the carrier is formed by a strip with transverse predetermined separation points. The carrier can then, for example, be wound into a roll or folded together as a stack.

BRIEF DESCRIPTION OF THE DRAWINGS

The invention is explained in greater detail hereinafter by way of example on the basis of the drawings in which:

FIG. 1: A plan view of an embodiment of the entitlement identity card according to the invention;

FIG. 2: A longitudinal section through the entitlement identity card according to FIG. 1 along the line 2—2, whereby the individual layers have been represented as exaggeratedly thick for better illustration;

FIG. 3: A plan view of an embodiment of the entitlement identity card according to FIG. 1, before folding together and the bonding in of the bar;

FIG. 4: Schematic view of a carrier, onto which the folded entitlement identity cards are adhesively bonded one after another;

FIG. 5: Plan view of the inner side of one of the two sections of another embodiment of the entitlement identity card;

FIG. 6: Plan view of the inner side of one of the two sections of yet another embodiment of the entitlement identity card.

DETAILED DESCRIPTION

According to FIG. 3, the entitlement identity card 1' consists, before folding together, of two sections 3, 4, which are separated by a fold line 2. The two sections 3, 4 are accordingly formed by a part or sheet, for example of a plastic film.

Secured to one section 4 is a contact-free readable and writable microchip 5 and an antenna 6 attached to the microchip 5. The antenna consists of a conductor which forms several windings in spiral fashion, and may be located on the section 4 by a printing process, for example.

The sections 3, 4, each feature on their inner sides adhesive layers 7, 8, respectively. Consequently, with the entitlement identity card 1, after folding together according to FIGS. 1 and 2, both sections 3, 4, are securely bonded to one another. The adhesive layer 8 of the section 4 may also cover the antenna 6 and, if applicable, the chip 5.

In order to be able to secure the entitlement identity card 1 to the clothing of the user, a loop or bar 9 is provided to function as the connective element. Bar 9 is bonded with its end sections 11, 12, represented as a dotted line in FIG. 1, between the adhesive layers 7, 8, of the two sections 3, 4.

Before the two sections 3, 4, are bonded together, the bar 9 is pushed through the eye 13 in the tab 14 of a zip fastener runner, not shown, on the clothing of the user.

The end sections 11, 12, of the bar 9 are angled in such a way that they cross the antenna 6 (FIG. 1) and are accordingly adhesively bonded within an area subtended by the antenna 6. In addition to this, as can be seen in FIG. 2, the end sections 11, 12, are curved at their ends in such a way that they engage behind the antenna 6. If an attempt is made to pull the bar 9 out of the entitlement identity card, this will destroy the antenna 8, and therefore render the identity card 1 unusable.

The embodiment according to FIG. 5 differs from that of FIGS. 1 and 2 essentially in that between the two sections, of which only the section 4 is shown in FIG. 5, a bar 9 is clamped in place in such a way that, as the arrow 15 indicates, it is subject to preliminary tension. The bar 9 is adhesively bonded to the antenna 6. If the bar 9 is separated, for example at 17, this will cause the two parts of the bar 9 to move in accordance with the arrows 15 into the position 9a, 9b, represented as dotted lines, and specifically also in the area of the antenna 6, as a result of which this will be destroyed. While with the embodiment according to FIGS. 1 and 2 the fold line 2 is arranged at the top, in the embodiment according to FIG. 5 it is arranged at the bottom.

The same applies to the embodiment according to FIG. 6, which incidentally also differs from the embodiments of FIGS. 1 to 3 and FIG. 5 in that the chip 5 is only secured to the part 6' of the antenna 6 at the section 4, while the loop or bar 9 forms the other part of the antenna. The two end sections 11, 12, of the bar 9 are in this situation formed and arranged in such a way that, with the identity card 1 bonded together, they come in contact with the two end sections 18, 19, of the antenna part 6'.

The adhesive surfaces 7, 8, with the sheet 1' folded up as shown in FIG. 3, are provided with a protective covering, for example of paper.

According to FIG. 4, the protective covering can be formed by the fields 20 of a striplike carrier 21, onto which the sheets 1' are adhesively bonded one behind another by their adhesive surfaces 7, 8. The fields 20 are separated from one another by predetermined separation lines 22 running transversely. The striplike carrier 21, with the sheets 1' bonded to it, may, for example, be unwound from a supply roll 23, or may be folded to form a supply stack.

What is claimed is:

1. An identity card assembly comprising:
   a card unit formed of two sections, the sections of said card unit having adjacent faces that are bonded to each other by adhesive material;
   an elongated connecting element dimensioned to be fitted through an aperture on the clothing of a wearer, said connecting element having opposed end sections, the opposed end sections of said connecting element being bonded to the portions of the card unit sections that are bonded to each other; and a chip containing electronically readable data and an antenna connected to said chip, said chip and said antenna being located between the card unit sections wherein at least a portion of said antenna is located between the portions of the card unit sections to which the connecting element end sections are bonded wherein, the connecting element end sections and said antenna are bonded to the card unit sections so that removal of either connecting element end section results in the destruction of said antenna or the disconnection of said chip and said antenna.

2. The identity card assembly of claim 1, wherein said chip and said antenna are secured to at least one of the card unit sections; and at least one card unit section is provided with an adhesive layer that bonds the card unit sections together.

3. The identity card assembly of claim 2, wherein said adhesive layer formed on at least one of the card unit sections is covered with a removable protective covering that is removed before the two card unit sections are bonded together.

4. The identity card assembly of claim 1, wherein at least one card unit section has the adhesive material at least in the area of said chip or said antenna, and the connecting element ends are bonded by said adhesive material to said chip or said antenna.

5. The identity card assembly of claim 1, wherein at least one of the two card unit sections is designed to be at least partially transparent.

6. The identity card assembly of claim 1, wherein said card unit is formed as a single piece and the card unit sections are separated from each other along a fold line.

7. The identity card assembly of claim 1, wherein:

said antenna has two disconnected end sections that are bonded to said card unit; and said connecting element is in the form of a conductive member that has end sections, wherein the end sections of said connecting element are bonded to the end sections of said antenna unit so that said connecting element functions as part of said antenna.

8. The identity card assembly of claim 1, wherein:

each said connecting element end section crosses over said chip or said antenna and is bonded between the card unit sections by the adhesive; and said connecting element end sections are curved and said connecting element end sections are bonded to said card unit so that each connecting element end section faces said chip or said antenna so that the pulling of either said connecting element end section away from said card unit results in the end section moving across said chip or said antenna so as to destroy said antenna or disconnect said chip and said antenna.

9. The identity card assembly of claim 1, wherein the connecting element is formed as a bar.

10. The identity card assembly of claim 9, wherein said bar has at least one end that engages over said antenna.

11. The identity card assembly of claim 10, wherein said bar is bonded to said card unit to be under tension.

12. An identity card assembly comprising:

a card unit formed of two sections, the sections of said card unit having adjacent faces that are bonded to each other;

a chip containing electronically readable data and an antenna connected to said chip, said chip and said antenna being located between the card unit sections wherein at least a portion of said chip or said antenna is located between portions of the card unit sections that are bonded to each other; and a connecting element dimensioned to be looped through a clothing aperture, said connecting element having opposed end sections, each said connecting element end section being located between the card unit sections that are bonded to each other and crossing over said antenna and being bonded between said card unit sections, wherein separation of the card unit sections to remove either said connecting element end section results in disconnection of said chip and said antenna or destruction of said antenna.

13. The identity card assembly of claim 12, wherein:

each said connecting element end section has a curved profile and defines an end of said connecting element; and said connecting element is mounted between the card unit sections so that the connecting element ends are located inward of where said chip or said antenna and are bonded to said card unit section and so that the connecting element ends face said antenna so that the pulling of either said connecting element end section away from said card unit results in the connecting element end associated with said end section moving across said antenna so as to disconnect said chip and said antenna or destroy said antenna.

14. The identity card assembly of claim 12, wherein said card unit is formed as a single piece and the card unit sections are separated from each other along a fold line.

15. The identity card assembly of claim 12, wherein at least one of the card unit sections is at least partially transparent.

16. The identity card assembly of claim 12, wherein said connecting element is a rigid member that is bonded between said card unit sections so as to be under tension and so that separation of said connecting element results in movement of the said connecting element end sections that destroys a portion of said antenna adjacent said connecting element end sections.

17. The identity card assembly of claim 12, wherein:

said chip and said antenna are secured to the face of one of the card unit sections; and an adhesive layer is disposed over the face of at least one of the card unit sections to bond the card unit sections together and to secure said chip and antenna to the card unit section.

18. An identity card assembly comprising:

a card unit formed of two sections, the sections of said card unit having adjacent faces that are bonded together by adhesive material;

a chip and an antenna connected to said chip; said chip and said antenna being located between the card unit sections, the antenna comprising two spaced apart sections, each said antenna section having an end terminal;

a conductive bar dimensioned to be looped through a clothing aperture, said conductive bar having spaced apart end sections, wherein each said conductive bar end section is located between the card unit sections and positioned to abut a separate one of the antenna end terminals so that said bar connects said antenna sections together and the adhesive material that bonds the card unit sections together holds the bar end sections against the antenna end terminals.

19. The identity card assembly of claim 18, wherein said card unit is formed as a single piece and the card unit sections are separated from each other along a fold line.

20. The identity card assembly of claim 18, wherein at least one of the card unit sections is at least partially transparent.

* * * * *